(12) United States Patent
Cuypers et al.

(10) Patent No.: US 9,187,370 B2
(45) Date of Patent: Nov. 17, 2015

(54) METHOD OF MAKING PARTICULATE MATERIAL

(71) Applicant: Rockwool International A/S, Hedehusene (DK)

(72) Inventors: Jean Marie Wilhelmus Cuypers, CX Linne (NL); Andreas Leismann, Bochum (DE); Stuart Lambie, Pulverbatch (GB)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 14/529,843

(22) Filed: Oct. 31, 2014

(65) Prior Publication Data

US 2015/0114265 A1  Apr. 30, 2015

Related U.S. Application Data

(62) Division of application No. 13/379,610, filed as application No. PCT/EP2010/058819 on Jun. 22, 2010, now Pat. No. 8,876,964.

(30) Foreign Application Priority Data

Jun. 23, 2009  (GB) .................................. 0910846.5
Jul. 13, 2009  (EP) .................................... 09251781

(51) Int. Cl.
| C04B 14/46 | (2006.01) |
| C04B 16/04 | (2006.01) |
| C03B 3/02 | (2006.01) |
| B02C 19/18 | (2006.01) |
| C03C 13/06 | (2006.01) |

(Continued)

(52) U.S. Cl.
CPC ................. *C04B 14/46* (2013.01); *B02C 19/18* (2013.01); *C03B 3/02* (2013.01); *C03C 1/02* (2013.01); *C03C 13/06* (2013.01); *C04B 16/04* (2013.01); *C04B 18/026* (2013.01); *C04B 28/02* (2013.01); *C03C 2213/00* (2013.01); *Y10T 428/2982* (2015.01)

(58) Field of Classification Search
CPC .......... C04B 14/46; C04B 16/04; C03B 3/02; B02C 19/18; C03C 13/06; C03C 2213/00
See application file for complete search history.

(56) References Cited

U.S. PATENT DOCUMENTS

| 4,529,377 A | 7/1985 | Zinn et al. |
| 4,838,784 A | 6/1989 | Lockwood, Jr. |

(Continued)

FOREIGN PATENT DOCUMENTS

| EP | 0410889 | 1/1991 |
| EP | 0913363 | 5/1999 |

(Continued)

*Primary Examiner* — Paul Marcantoni
(74) *Attorney, Agent, or Firm* — Tarolli, Sundheim, Covell & Tummino LLP

(57) ABSTRACT

The invention relates to a method of making a particulate material comprising; providing mineral wool base material in a form having size at least 80% not more than 40 mm, subjecting the mineral wool base material to sintering by use of a pulse combustor and thereby forming a particulate material in the form of particles having size at least 80% not more than 20 mm. An apparatus for carrying out the method comprises means for size reduction of coherent mineral wool substrate and a reaction chamber in communication with a pulse combustor.

16 Claims, 1 Drawing Sheet

(51) Int. Cl.
*C03C 1/02* (2006.01)
*C04B 18/02* (2006.01)
*C04B 28/02* (2006.01)

(56) References Cited

U.S. PATENT DOCUMENTS

| | | |
|---|---|---|
| 5,136,793 A | 8/1992 | Kubotani |
| 5,255,634 A | 10/1993 | Mansour |
| 5,842,289 A | 12/1998 | Chandrah et al. |

FOREIGN PATENT DOCUMENTS

| | | |
|---|---|---|
| JP | 347302 | 2/1991 |
| JP | 2002348181 | 12/2002 |
| WO | 03002469 | 1/2003 |
| WO | 2005019749 | 3/2005 |
| WO | 2008004407 | 1/2008 |

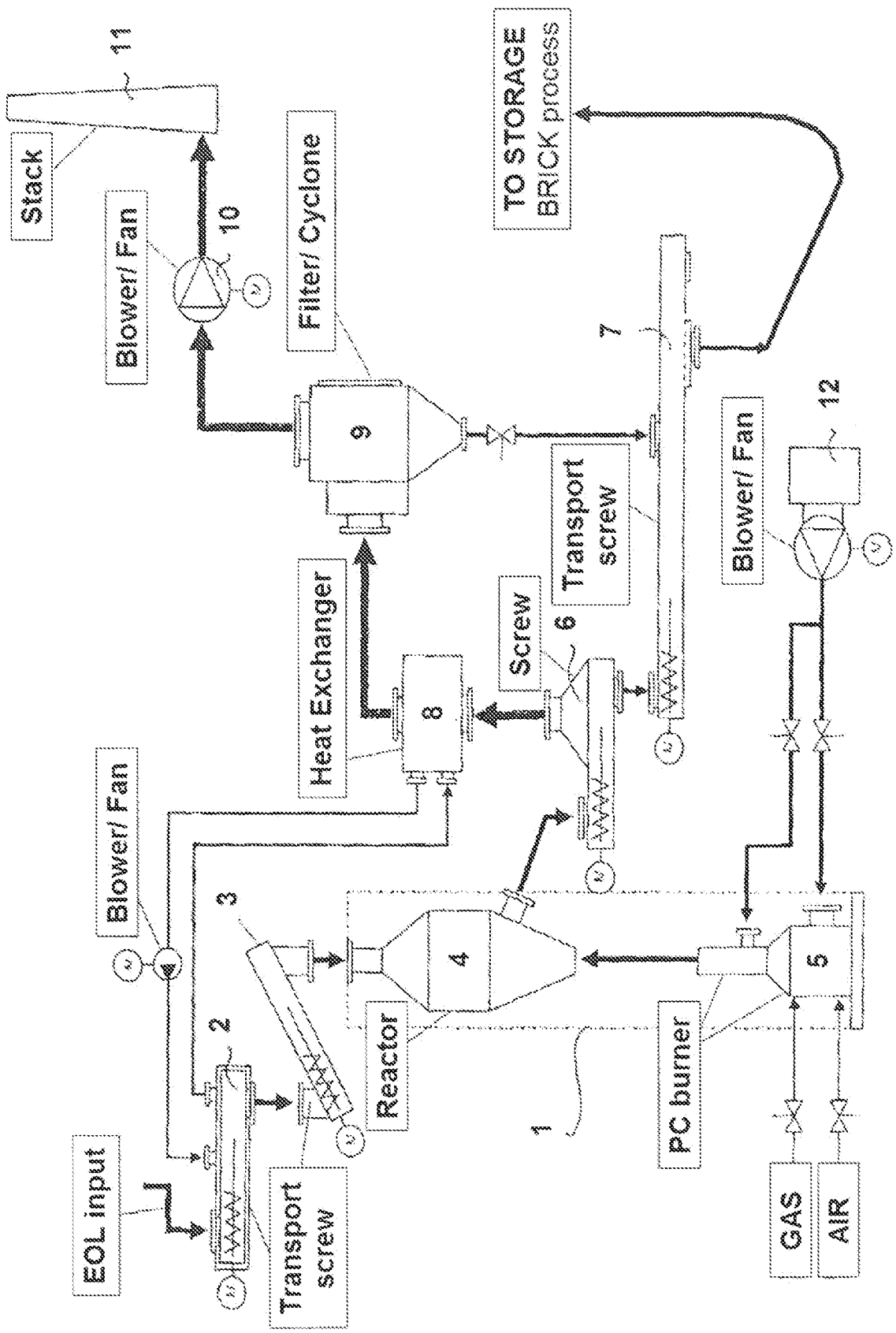

METHOD OF MAKING PARTICULATE MATERIAL

CROSS-REFERENCE TO RELATED APPLICATIONS

This application is a Divisional of U.S. patent application Ser. No. 13/379,610, filed Apr. 13, 2012, which is a national phase application of, claims priority to, and any other benefit of, International Application No.: PCT/EP2010/058819, filed on Jun. 22, 2010, which claims priority to, and any other benefit of GB 0910846.5, filed Jun. 23, 2009 and EP 09251781.2, filed Jul. 13, 2009, all of which are hereby incorporated by reference in their entirety.

FIELD OF THE INVENTION

This invention relates to methods of producing particulate materials which are suitable for applications including in particular use as a raw material for the production of mineral fibres.

BACKGROUND OF THE INVENTION

Mineral wool is produced for use in numerous applications, such as sound insulation, heat insulation, fire protection, construction applications and as a horticultural growth substrate. In order to produce mineral wool it is necessary first to form a mineral melt, from mineral materials, and to form this melt into fibres. The mineral materials can be in the form of crushed rock or other large size material, but it is also in some processes important to provide the mineral materials as small particles.

For instance, it is common to provide at least part of a raw material charge in the form of bonded briquettes formed of a relatively small size particulate materials bonded together with a binder, which is commonly cement. These small size particle materials can for instance be waste materials from industrial processes, milled waste mineral wool itself and virgin raw materials having small particle size, such as various types of sand.

It is known to use waste mineral fibres themselves as materials for inclusion in such briquettes.

The inclusion of raw materials in lump or briquette form is usually done when the mineral melt is produced in a shaft furnace such as a cupola furnace. There are other means of generating a melt, for instance in a tank furnace or in a cyclone furnace (such as described in WO 0302469), or in an electrical furnace. In these methods it is not necessary that the raw materials are in large particle form but instead they may be in the form of fine particles when they are added to the relevant furnace.

It would be desirable to produce raw materials which are suitable for inclusion as raw materials in the production of mineral wool, and which are versatile enough to be able to be used as a component of briquettes, especially cement briquettes, which are the most common form of briquette used in the production of mineral fibres, and which can lead to briquettes of appropriate quality including their chemistry, density and strength. It would also be desirable if such materials were also suitable for use directly in fine particle form such as the cyclone, electrical and tank furnaces mentioned above.

SUMMARY OF THE INVENTION

Thus according to the invention we provide a method of generating a particulate material comprising;

providing mineral wool base material in a form having size at least 80% not more than 40 mm and preferably having water content not more than 70%, subjecting the mineral wool base material to sintering by use of a pulse combustor and thereby forming a particulate material in the form of particles having size at least 80% not more than 20 mm.

This method has the advantage that it is possible to use waste mineral wool materials of all kinds, including those which are generated as end-of-life products formerly used as horticultural growth substrates. The method above allows the reuse of such substrates despite the fact that they contain high levels of water and normally organic material, such as plant material embedded within the substrate and/or plastic film surrounding the substrate. Thus this invention provides a convenient means of reusing this end of life material other than, say, sending it to landfill or using it for the fabrication of bricks. This latter method requires separation of the polymeric packaging from the mineral wool growth substrate and a pre-treatment step. A particular advantage of the method of the invention is that the volume of the waste material can be reduced by around 50%.

Use of a pulse combustion apparatus to dry and sinter the mineral wool base material is very energy-efficient and we find it can lead to very low levels of emissions.

A further advantage of use of a pulse combustion system is that it can be produced so as to be a mobile unit.

The product of the process of the invention has advantages over commercial granular materials supplied for inclusion in cement-based products that it shows high values of initial saturation and a very low (or zero) sinking value and is therefore easier to mix with the cement.

The product is also excellent as a component of briquettes for production of mineral wool, and has the advantage that, being produced from mineral wool, and not requiring the inclusion of substantial additives, it can have a similar chemical composition to the desired end product fibres.

In comparison with untreated dry waste mineral wool the product of the process of the invention can include fibres of more uniform length and diameter.

According to the invention we use a mineral wool base material. The mineral wool can be glass or slag wool but is preferably stone wool.

Preferably the stone wool fibres are formed of a composition that contains, by weight of oxides, at least 15% total CaO plus MgO plus FeO (total iron oxide being calculated and reported as FeO). Preferably the content of alkali metal oxides $Na_2O$ plus $K_2O$ is not more than 10%, especially not more than 7%, in particular not more than 4%, especially not more than 3%. For instance, the stone wool may be formed of a composition having oxide contents in the following ranges:

$SiO_2$ 30 to 60%, preferably 36 to 45%
$Al_2O_3$ 4 to 30%, preferably 14 to 24%
CaO plus MgO 5 to 40%, preferably 25 to 35%
CaO 10 to 30%, preferably 18 to 24%
MgO 5 to 25%, preferably 7 to 12%
FeO 2 to 15%, preferably 4 to 10%
$Na_2O$ plus $K_2O$ up to 12%, preferably 1 to 5%
$Na_2O$ up to 6%, preferably 1 to 4%
$K_2O$ up to 6%, preferably 0.2 to 3%
$TiO_2$ up to 6%, preferably 0.4 to 4%

The stone wool may be formed of a composition including $P_2O_5$ in an amount of not more than 3%, preferably not more than 2%.

Preferably the mineral wool base material is formed of waste mineral wool. Thus it can be waste mineral wool from a factory or, preferably, waste mineral wool which has previously been used in one of the known applications for mineral wool and has reached the end of its useful life (namely end-of-life material). Preferably it is waste horticultural growth substrate. This includes plugs, slabs, blocks and mats and can be a mixture of one or more of these types of product. In particular it is green house substrate including organic material, such as plastic film and plant material, and often nutrients added by the grower during use or horticulture. It is preferred that the waste mineral wool material has a content of water, for instance at least 10% water (by weight based on weight of the waste mineral wool). The level of water in the waste mineral wool initially provided can preferably be at least 40% and in some cases can be at least 50%, but generally it is preferred that the water content is not more than 55%. Horticultural growth substrates in most cases have water content within these ranges at the end of their useful life.

When the water content of the initially provided material is above 70% then the product should preferably be treated to form the base mineral wool material so as to reduce the water content to not more than 70%. Preferably the water content is no more than 50%, especially when the method includes a fine grinding step (discussed below). In some cases it is preferred that the water content is not more than 40% although normally this is not necessary.

The waste mineral wool used to form the mineral wool base material used in the method is preferably end-of-life used horticultural growth substrate. Such material preferably has a content of plastic/polymeric material in the range 0.05 to 0.5%, by weight based on the wet material. It preferably has a content of binder in the range 0.5 to 5%, by weight based on the wet material. It preferably has a content of plant residues in the range 1 to 5%, by weight based on the wet material. It preferably has a wet density in the range 520 to 780 kg/m$^3$. It preferably has a dry density in the range 260 to 450 kg/m$^3$. It preferably has an ignition loss in the range 2 to 7%, by weight based on the wet material.

The mineral wool base material used in the method should have size at least 80% below 40 mm. The "size" is the maximum dimension and this can be determined by known methods including sieving.

If the waste mineral wool is not received in a form in which at least 80% by weight is in the form of particles having size not more than 40 mm, then it is necessary to carry out a step of reducing this material to the required particle size. For instance, waste horticultural growth substrate and other waste mineral so wool products are often received in the form of a coherent substrate product such as a slab, block or mat (including mixtures of one or more of these types of product) often having minimum dimension at least 50 mm, often at least 100 mm. Waste horticultural growth substrate may also include plug products, often having minimum dimension below 40 mm but above 20 mm, and such products may not require size reduction for use in the invention.

The minimum dimension is the shortest distance from one surface of the coherent product to another surface. Thus a slab of dimensions 1200 mm×750 mm×75 mm will have minimum dimension of 75 mm.

Reduction to the particle size at least 80% below 40 mm can be carried out by any suitable method, including shredding, milling and grinding, preferably shredding.

This size reduction step, if used, can in itself result in loss of water from the substrate, if water is initially present. This step should result in a product which has a content of water not more than 70 wt %, preferably not more than 55%, especially not more than 50 wt % and in some cases preferably not more than 40%, especially not more than 35%, in particular not more than 25 wt %.

This lower water content such as not more than 35% or 25% is particularly useful if the end product is to be incorporated into cement bonded briquettes (especially at a level of greater than 6 wt % based on the weight of the briquettes). The lower water content aids in allowing the briquettes to have a greater strength. If the water content is too high then the strength is inadequate even when relatively high levels of cement binder are used. High levels of cement binder are anyway undesirable as they lead to higher levels of SO$_2$ emissions during melting to form mineral wool.

In the invention the water content of the base mineral material is reduced during the pulse combustion sintering step but it can also be reduced to some extent in advance, as mentioned above. An advantage of the method of the invention is that it is not always necessary to have a separate water reduction step prior to the pulse combustion sintering step.

It can be desirable to filter out large particles, especially large plastic elements of size about 40 mm (or greater) when the mineral wool base material is produced from horticultural growth substrate packaged in polymeric film.

Generally waste horticultural growth substrate is received in a form with organic materials, which can be plant residues, and usually include polymeric packaging material. A large part (often at least 50%, preferably at least 80%) of this polymeric film packaging material is normally removed during, before or after the size reduction step (most often during the size reduction step) and subjected to a separate size reduction process to at least 80 wt % below 40 min, preferably below 30 mm and more preferably below 20 mm. Usually this is done by shredding. This is done separately from the mineral material size reduction process because this fine shredding process of the polymeric film is made easier in the absence of moist mineral wool.

Preferably the size reduced polymeric film material is combined with the size reduced mineral wool base material and both are included in the pulse combustion sintering step. Inclusion of the polymeric film material in this stage has the advantage of providing energy to the process. This increases the energy efficiency of the process as a whole. For instance, the additional energy provided by the polymeric film can be used in a step of pre-drying the mineral wool base material prior to the pulse combustion sintering step.

As mentioned above, it is preferred to subject the mineral wool base material to a step of reducing the content of organic material. Organic material can include plant residues, polymeric packaging film, and binder. This is particularly preferred when the end product is intended for inclusion in cement bonded briquettes. Reduction in the organic content can lead to an increased speed of curing in the final briquettes. This separation step which separates at least part of the organic material from the mineral wool can be done for instance by shredding, milling, grinding, wind sieving or rotation. Usually the organic material separated is predominantly polymeric packaging film.

The base material is formed of mineral wool product (including water and organics such as remaining polymeric film and/or plant residues in some cases) but may also comprise other material, which can be in wet or dry form. Other materials include coco growth substrate, sawdust, perlite, pumice and peat. Preferably at least 70% of the base material is mineral wool, based on solid material, and in particular at least 80% of the base material is mineral wool, based on solid material. In particular, substantially 100% of the inorganic material in the base material is mineral wool.

The base material can be subjected to a fine grinding stage to generate particulate base material in which at least 80 wt % of the material has size not more than 20 mm, preferably not more than 15 mm and more preferably not more than 10 mm, but this is usually not necessary. If this step is used it is normally done after a step of removal of substantial amounts (e.g. at least 80 wt % of the originally present amount) of polymeric packaging film, if present in the mineral wool product starting material.

If a fine grinding step is used then the water content of the base material entering the fine grinding step is preferably not more than 60 wt %, more preferably not more than 50 wt %, in particular not more than 45 wt %.

The base material may also comprise particulate products of the process of the invention recycled into the method itself.

It is possible to form the base material into granules, although this is not usually necessary and therefore it is preferred not to granulate, given that this introduces an additional technical step and additional energy requirements. If granulation is done, it can be done by any known method for forming granules such as in low shear or high shear mixtures or in a pelletising device involving a rotating disk or cylinder. Granulation may be done by adding water such as by spraying on to the moving mixture.

It is also possible to include binder in the base material, especially if a granulation step is to be included. If binder is used it is preferably organic and is burned off during the pulse combustion sintering step. However, it is often unnecessary to include binder and therefore from an economical and environmental point of view, it is preferred not to include binder. Thus preferably no binder is added during course of the method (from the step of providing the mineral wool base material to the generation of the end product). Preferably also no binder is added during the generation of the mineral wool base material from waste mineral wool, if it is produced in this way.

If used, binder is combined by mixing with the base material to form a base-binder mixture. If used, binder is preferably organic, e.g. starch. It can be inorganic, such as clay, but can also for instance be cement or lime or gypsum. If used, the most preferred clay is bentonite clay. If used, the amount of binder is preferably in the range 1 to 25 wt % of the total weight of base material and binder. More preferably it is 1 to 10 wt %, most preferably 3 to 7 wt %, based on dry material content of the base material.

Generally other additives are not required and so none are included.

In this specification the water (or moisture) content is assessed at the various stages by subjecting a weighed sample to heating at 105° C. for a time long enough for a constant weight to be achieved (i.e. for any moisture to have evaporated) and re-weighed to determine the loss of weight.

Prior to the pulse combustion sintering step it is possible to subject the mineral wool base material to a pre-drying step. Water content of the base material entering the pulse combustion sintering step is normally not more than 50 wt % but can be up to 70 wt % and in some cases is preferably not more than 35%.

Once the appropriate mineral wool base material having the defined size and water content has been generated it is subjected to a drying and sintering step by pulse combustion. This step subjects the base material to sintering so that at least part of each particle of base material is sintered. It is not necessarily the case that each particle is sintered throughout its volume. This can happen but depends on the conditions, the time in the pulse combustion sintering stage, the size of the particles of base material etc.

The material subjected to the sintering step is preferably a blend of mineral wool base material and size-reduced polymeric film. The amount of mineral wool base material in the blend is preferably at least 50 wt %, more preferably at least 70 or 80 wt %.

In this step it is passed to a reaction chamber connected to a pulse combustion apparatus, which results in a temperature in the reaction chamber in the range 900 to 1050° C., preferably 950 to 1000° C. The pulse combustion step has the effect of very rapidly removing the organic materials by combustion but without melting the mineral wool component of the base material. Instead the mineral wool component is sintered. A significant mass reduction in the product occurs, whereby often at least 30%, preferably at least 40% of the mass of the base starting material is lost, often around 50% of the mass, although it can be up to 70%, depending on the moisture content and organics content of the base material.

The frequency of the pulse combustor should be at least 100 Hz, preferably at least 150 Hz, for instance about 200 Hz.

The pulse combustor is generally fuelled by methane and/or propane and can be provided with a methane and/or propane-air input.

The conditions are chosen to maximise turbulence in the reaction chamber, which is believed to improve the efficiency of the process. The turbulence can be increased by, for example, providing dividing plates in the combustion chamber.

Pulse combustors are well known for use in other applications. For instance, forms of pulse combustor apparatus are described in U.S. Pat. No. 4,529,377, WO 2008/004407, U.S. Pat. No. 5,136,793, U.S. Pat. No. 4,838,784, U.S. Pat. No. 5,255,634 and WO 2005/019749, all for treatment of different types of base material than mineral wool base material.

The final product generally has very low water content such that it is substantially dry the water content is generally below 5 wt %, preferably below 2 wt % and in some cases substantially zero. The final product is also substantially free of organics, which are thus usually below 5 wt %, in particular below 2 wt % and especially substantially zero. This has advantages that the final product can be included with ease in various mineral wool production processes as a raw material, especially as a component of cement briquettes, as discussed above.

The product is particulate solid material and has size at least 80 wt % not more than 20 mm but is often smaller, e.g. at least 80 wt % not more than 10 mm, or not more than 5 mm. More preferably the size can be at least 80 wt % not more than 1 mm.

Preferably the product has a composition that contains, by weight of oxides, at least 15% total CaO plus MgO plus FeO (total iron oxide being calculated and reported as FeO). Preferably the content of alkali metal oxides $Na_2O$ plus $K_2O$ is not more than 10%, especially not more than 7%, in particular not more than 15%, especially not more than 3%. For instance, the product can have a composition having oxide contents in the following ranges:

$SiO_2$ 30 to 60%, preferably 36 to 45%
$Al_2O_3$ 4 to 30%, preferably 14 to 24%
CaO plus MgO 5 to 40%, preferably 25 to 35%
CaO 10 to 30%, preferably 18 to 24%
MgO 5 to 25%, preferably 7 to 12%
FeO 2 to 15%, preferably 4 to 10%
$Na_2O$ plus $K_2O$ up to 12%, preferably 1 to 5%
$Na_2O$ up to 6%, preferably 1 to 4%
$K_2O$ up to 6%, preferably 0.2 to 3%
$TiO_2$ up to 6%, preferably 0.4 to 4%

The product may have a composition including $P_2O_5$ in an amount of not more than 3%, preferably not more than 2%.

The product preferably has ignition loss below 1%.

The product of the method of the invention can be used in a variety of applications, including construction applications, and in mixtures for the production of elements such as paving stones, but is especially useful when used as a raw material for the production of mineral wool. It can be included as a component of briquettes, especially cement briquettes, for this purpose, or added directly to a furnace such a cyclone, electrical or tank furnace.

The granular products can have certain values of initial saturation and sinking time. For measurement of initial saturation, a sample of particles of a predetermined volume is submerged in water for a predetermined period (a few minutes is adequate), the particles are then drained, under gravity, and weighed to give the amount (by volume) of water absorbed, the results being quoted as % volume water taken up for the (bulk) volume of particles in the original sample. The particles have relatively high initial saturation values, which leads to benefits in their use in cement-based mixtures.

The sinking property is determined by dispersing a sample of particles onto the surface of water and then after a few minutes (2 minutes is usually enough) the number of particles still floating is counted. The % of floating particles is reported. For conventional expanded clay particles, such as the commercial product Argex, the values are relatively high, up to or more than 60%, e.g. ranging from 11 to 66%. For the particles made by the process of the invention there are usually no particles floating at that time, thus the value is zero. This results in easier mixing of the particles into the cement-based mixture.

BRIEF DESCRIPTION OF THE DRAWING

FIG. 1 is an overview of an example of an entire pulse combustor plant for sintering mineral wool base material.

DETAILED DESCRIPTION FO THE DRAWING

Mineral wool base material in the form having a size at least 80% not more than 40 mm and a water content not more than 70%, also called waste mineral wool material or end of life (EOL) material, is fed to a pulse combustor apparatus (1), which apparatus consists of a reactor chamber (4) and a pulse combustor burner (5), via the first feeding screw (2) (or other appropriate feeding device). The EOL material has previously been reduced in size in, e.g., a shredding process.

In the first feeding screw (2) the EOL material is pre-heated by use of exhaust gases from the particulate material exiting the pulse combustor apparatus (1) which preheating step will be explained further below. The pre-heated EOL material then exits the first feeding screw (2) and is fed to a second feeding screw (3) (or other appropriate feeding device) which transports the EOL material and feeds it to the top of the reactor chamber (4) of the pulse combustor apparatus (1).

The reactor chamber (4) of the pulse combustor apparatus (1) is situated on top of the pulse combustor burner (5), which pulse combustor apparatus is known per se. The pulse combustor burner (5) is coupled to a fan (12) for supplying air to the pulse combustor burner (5). Pressurised air could be used instead of a fan. Furthermore, fuel such as methane and/or propane gas is supplied to the pulse combustor burner (5). The pulse combustor burner is driven at a frequency of at least 100 Hz, preferably at least 150 Hz, for instance 200 Hz.

In the reactor chamber (4) organic waste residues such as plastic, roots, binder etc. present in the EOL material are essentially instantaneously burned away and the mineral wool waste material is dried, incinerated and partly sintered at a temperature in the reaction chamber (4) in the range 900 to 1050° C., preferably 950 to 1000° C. The pulsing of the pulse combustor and the internal configuration of the reaction chamber create a turbulent flow in the reactor chamber (4) which ensures that the EOL material in the reactor chamber does not stick or sinter together into lumps but sinters and forms a particulate material having a size at least 80% not more than 20 mm. It may happen that all of the particulate material is not sintered all the way through as this depends on the reactor dwell time and the size of the EOL material to be sintered (as well as the temperature in the reaction chamber and the combustible content of the input feed). The dwell time can for instance be 1 to 2 seconds.

After sintering of the EOL material in the reactor chamber (4) the hot particulate material (temperature approximately 900 to 1050° C.) leaves the reactor chamber (4) and enters a first transport screw (6) (or other appropriate transporting device). The hot gases and dust from the particulate material enter a heat exchanger (8), which heat exchanger is coupled to the first feeding screw (2). The heat generated from the heat exchanger (8) is then used for pre-heating the EOL material in the first feeding screw (2).

The dust-filled gas stream containing fine and coarse dust arising from the particulate material in the first transport screw (6) leads to a dust filter or dust cyclone (9) which precipitates or separates the fine dust from the gas. The dust filter or dust cyclone (9) can also be any other appropriate device able to separate dust from gas in order to maintain and secure permitted dust emissions. The dust is fed to a second transport screw (7) (or other appropriate transporting device) and the cleaned gas from the dust filter is led to the stack (11) via a blower (10). The particulate material (coarse fraction) in the first transport screw (6) exits into the second transport screw (7) and is transported to a storage facility after which it can be used as a raw material, for example in a cement briquetting process.

Briquettes made by this process can e.g. be used as raw material in a cupola furnace in the production of mineral wool fibres.

It is to be understood that FIG. 1 and the description thereof is only an example of a pulse combustor plant for performing the method according to the invention. The equipment or apparatus might in other embodiments differ front what is shown.

The invention claimed is:

1. A method of making a mineral melt for the production of mineral fibres, comprising:
   providing a raw material; and
   melting the raw material thereby forming a mineral melt;
   wherein the raw material is a particulate material;
   and wherein the particulate material is made by a method comprising:
      providing mineral wool base material in a form having size at least 80% not more than 40 mm,
      subjecting the mineral wool base material to sintering by use of a pulse combustor
      and thereby forming a particulate material in the form of particles having size at least 80% not more than 20 mm.

2. A method of making bonded briquettes, comprising:
   providing a particulate material;
   providing a binder; and
   forming the particulate material and the binder to make bonded briquettes;
   wherein the binder comprises cement;
   and wherein the particulate material is made by a method comprising:

providing mineral wool base material in a form having size at least 80% not more than 40 mm, subjecting the mineral wool base material to sintering by use of a pulse combustor and thereby forming a particulate material in the form of particles having size at least 80% not more than 20 mm.

3. The method according to claim 2 additionally comprising melting the briquettes to form a mineral melt and forming the mineral melt into mineral wool.

4. A method of construction, comprising:

providing a particulate material;

undertaking a construction process using the particulate material;

wherein the particulate material is made by a method comprising:

providing mineral wool base material in a form having size at least 80% not more than 40 mm, subjecting the mineral wool base material to sintering by use of a pulse combustor and thereby forming a particulate material in the form of particles having size at least 80% not more than 20 mm.

5. The method according to claim 1 in which the mineral wool base material comprises at least 80 wt %, based on the total base material, waste mineral wool product.

6. The method according to claim 5 in which the waste mineral wool product is waste horticultural growth substrate.

7. The method according to claim 1 in which the mineral wool base material comprises organic material.

8. The method according to claim 1 in which the waste mineral wool product is waste horticultural growth substrate comprising polymeric packaging film.

9. The method according to claim 2 in which the mineral wool base material comprises at least 80 wt %, based on the total base material, waste mineral wool product.

10. The method according to claim 9 in which the waste mineral wool product is waste horticultural growth substrate.

11. The method according to claim 2 in which the mineral wool base material comprises organic material.

12. The method according to claim 2 in which the waste mineral wool product is waste horticultural growth substrate comprising polymeric packaging film.

13. The method according to claim 4 in which the mineral wool base material comprises at least 80 wt %. based on the total base material, waste mineral wool product.

14. The method according to claim 13 in which the waste mineral wool product is waste horticultural growth substrate.

15. The method according to claim 4 in which the mineral wool base material comprises organic material.

16. The method according to claim 4 in which the waste mineral wool product is waste horticultural growth substrate comprising polymeric packaging film.

\* \* \* \* \*